United States Patent
Purushotham et al.

(10) Patent No.: US 11,556,646 B2
(45) Date of Patent: Jan. 17, 2023

(54) IDENTIFYING AND RESPONDING TO A SIDE-CHANNEL SECURITY THREAT

(71) Applicant: International Business Machines Corporation, Armonk, NY (US)

(72) Inventors: Srinivas Bangalore Purushotham, Bangalore (IN); Santosh Balasubramanian, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 852 days.

(21) Appl. No.: 16/427,550

(22) Filed: May 31, 2019

(65) Prior Publication Data

US 2020/0380130 A1    Dec. 3, 2020

(51) Int. Cl.
    G06F 21/56        (2013.01)
    G06F 9/455        (2018.01)
    G06F 3/06         (2006.01)

(52) U.S. Cl.
    CPC .......... *G06F 21/566* (2013.01); *G06F 3/0622* (2013.01); *G06F 3/0653* (2013.01); *G06F 3/0659* (2013.01); *G06F 3/0673* (2013.01); *G06F 9/45558* (2013.01); *G06F 2009/45583* (2013.01); *G06F 2009/45587* (2013.01); *G06F 2221/034* (2013.01)

(58) Field of Classification Search
    CPC .... G06F 21/566; G06F 3/0622; G06F 3/0653; G06F 3/0659; G06F 3/0673; G06F 9/45558; G06F 2009/45583; G06F 2009/45587; G06F 2221/034
    See application file for complete search history.

(56) References Cited

U.S. PATENT DOCUMENTS

| | | | |
|---|---|---|---|
| 2012/0240112 A1* | 9/2012 | Nishiguchi | G06F 9/45558 718/1 |
| 2014/0215613 A1 | 7/2014 | Kelley | |
| 2015/0339480 A1 | 11/2015 | Lutas | |
| 2016/0337390 A1* | 11/2016 | Sridhara | G06N 20/00 |
| 2018/0107823 A1 | 4/2018 | Samadani | |
| 2019/0213330 A1* | 7/2019 | Shen-Orr | G06F 12/1027 |
| 2022/0067157 A1* | 3/2022 | Le Rolland | G06F 12/1408 |

OTHER PUBLICATIONS

Wei et al., "Modeling the Runtime Integrity of Cloud Servers: a Scoped Invariant Perspective", Computer Communications and Networks, Springer-Verlag London 2013, 24 pps., <https://pdfs.semanticscholar.org/e691/660660a78620e4e779bc2b4ffc0cf64f24fc.pdf>.

* cited by examiner

*Primary Examiner* — Theodore C Parsons
*Assistant Examiner* — Howard H. Louie
(74) *Attorney, Agent, or Firm* — Michael A. Petrocelli

(57) ABSTRACT

A method for managing memory within a computing system. The method includes one or more computer processors identifying a range of physical memory addresses that store a first data. The method further includes determining whether a second data is stored within the range of physical memory addresses that stores the first data. The method further includes responding to determining that the second data is stored within the range of physical memory addresses that store the first data, by determining whether a process accessing the second data is identified as associated with a side-channel attack. The method further includes responding to determining that the process accessing the second data is associated with the side-channel attack, by initiating a response associated with the process accessing the second data.

20 Claims, 4 Drawing Sheets

IDENTIFYING AND RESPONDING TO A SIDE-CHANNEL SECURITY THREAT

BACKGROUND OF THE INVENTION

The present invention relates generally to the field of computer security, and more particularly to identifying and responding to side-channel threats targeting volatile memory within a computing system.

In computer security, a side-channel attack is any attack based on information gained from the implementation of a computer system, rather than weaknesses in the implemented algorithm itself (e.g., cryptanalysis and software bugs). Timing information, power consumption, electromagnetic leaks or even sound can provide an extra source of information, which can be exploited. Some side-channel attacks require technical knowledge of the internal operation of the system; although others such as differential power analysis are effective as black-box attacks. One example of a side-channel attack is a cache attack, where the attack is based on an attacker's ability to monitor cache accesses made by the victim in a shared physical system, such as in virtualized environment or a type of cloud service. A cache attack monitors security critical operations, such as AES T-table entry.

Memory attacks and vulnerabilities have been found to compromise mobile devices to the extent that the hackers were able to obtain complete control of the mobile device. For example, a cyber-attack targeting information leakage can indirectly modify the system and/or access control data stored in memory by directing access-based attacks towards memory hardware. One example of a side-channel attack that targets hardware memory, specifically dynamic random-access memory (DRAM), is based on the "rowhammer" vulnerability. Rowhammer is an unintended and undesirable side effect in DRAM in which memory cells leak their charges and interact electrically with other adjacent memory cells, possibly leaking or changing the contents (e.g., flipping bits) within cells of nearby memory rows that were not addressed in the original memory access requests. This bypass of the isolation between DRAM memory cells results from the high cell density in modern DRAM and can be triggered by a process utilizing access patterns (e.g., data reads) that rapidly activate the same memory rows numerous times. Another variant is a throwhammer attack, which utilizes high-speed network communications and remote direct memory access (RDMA) to affect information within DRAM.

SUMMARY

According to an aspect of the present invention, there is a method, computer program product, and/or system for managing memory within a computing system. The method includes at least one computer processor identifying a range of physical memory addresses that store a first data. The method further includes at least one computer processor determining whether a second data is stored within the range of physical memory addresses that stores the first data. The method further includes at least one computer processor responding to determining that the second data is stored within the range of physical memory addresses that store the first data, by determining whether a process accessing the second data is identified as associated with a side-channel attack. The method further includes at least one computer processor responding to determining that the process accessing the second data is associated with the side-channel attack, by initiating a response associated with the process accessing the second data.

DETAILED DESCRIPTION

Figure 1:
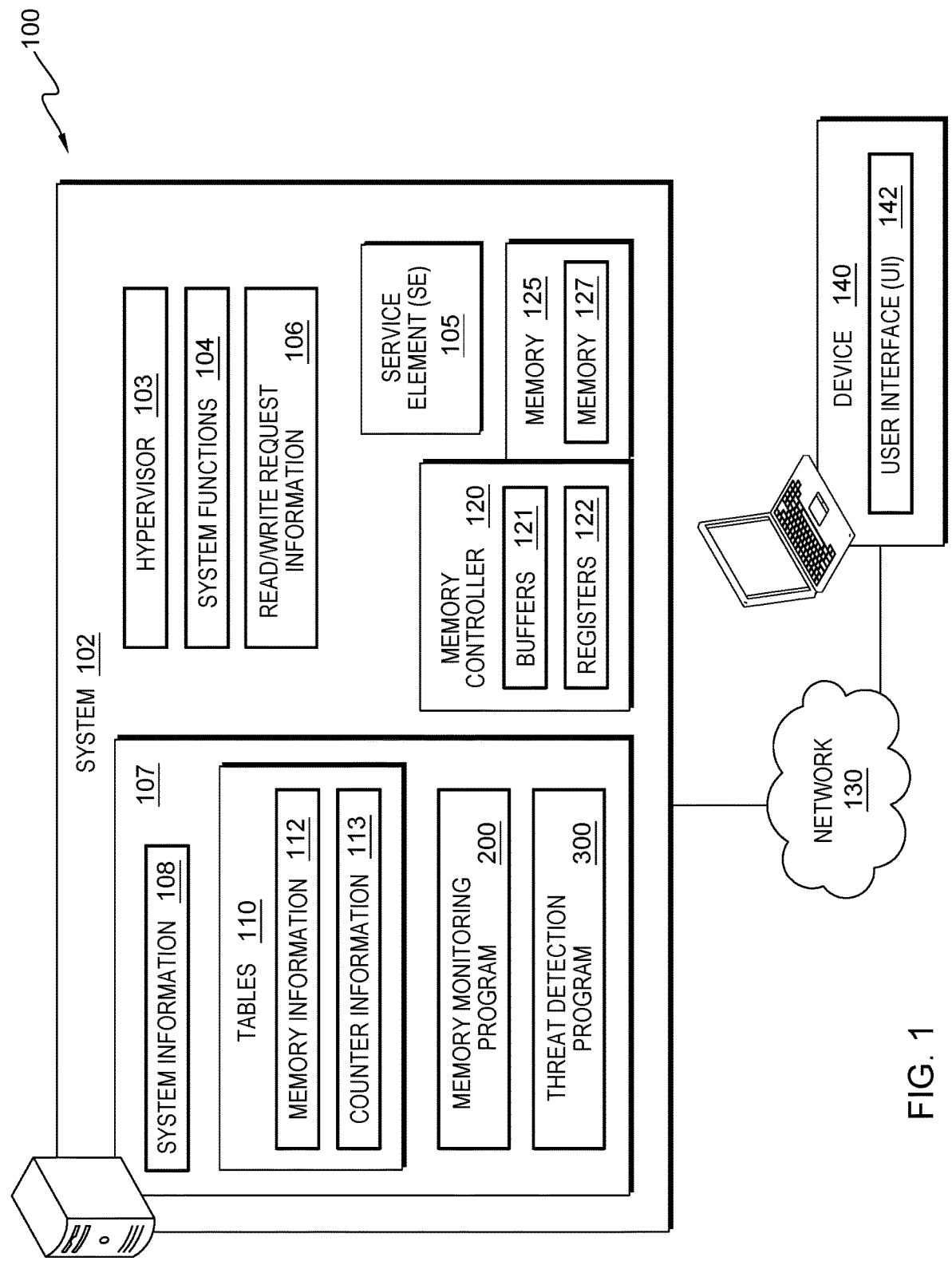
FIG. 1 illustrates a networked-computing environment, in accordance with an embodiment of the present invention.

Embodiments of the present invention recognize that the demands for cloud-based infrastructure and cloud-based solutions are increasing. Various companies are offering hardware and software solutions to address this increased demand for computing resources and infrastructures to host services and applications the cloud (e.g., public, private, and/or hybrid clouds). Embodiments of the present invention recognize that even as companies invest heavily in security measures for on-premises computing systems or private cloud infrastructures, malicious individuals can still breach the security measures. With regard to hybrid cloud and public cloud infrastructures, the potential for security breaches increases because of the increased number of users and fewer constraints on the user and the programs that the users execute.

Embodiments of the present invention recognize that as computing systems utilize more open-source software and provide open-architecture information related to various hardware elements within a computing system, such as interface cards, graphics cards, networking cards, accelerator cards, etc., malicious individuals can access and exploit the information to devise ways to compromise a computing system. Embodiments of the present invention recognize that standard security protocols can detect, identify, and address direct cyberthreats; however, speed and miniaturization technology improvements associated with integrated circuits can inadvertently produce other vulnerabilities that can be exploited via side-channel attacks.

Further, embodiments of the present invention recognize that computing architectures vary and the software that directly interfaces with and controls the hardware resources can differ. For example, a Type 1 hypervisor installs as the operating system of a computing system and directly communicates with the physical resources of a computing system and paravirtualizes the physical resources for provisioning to computing entities, such as logical partitions (LPARs), virtual machines, containers, virtual input/output services, etc. Alternatively, a Type 2 hypervisor is hosted by an already installed and executing operating system (OS) of the computing system, where the OS can have more control over the hardware resources than the hypervisor. Embodiments of the present invention recognize that by utilizing dynamic memory allocation and memory virtualization, system processes and critical information of a computing system are not isolated within fixed physical memory address ranges (e.g., memory addresses of one or more DRAM modules); and therefore, user processes can be allocated memory addresses within a range of physical memory addresses (e.g., memory blocks) containing information identified as critical for the computing system.

Embodiments of the present invention recognize that some side-channel attacks can indirectly modify system and/or access control data stored in memory by directing access-based attacks towards memory hardware, as opposed to determining information via indirect methods. Embodiments of the present invention recognize that side-channel attacks that trigger information changes (i.e., random bit-flips) within one or more nearby memory cells that were not addressed in an original memory access request (e.g., data read). Over time, even random bit-flips can corrupt data critical to security, authentication, access control, and/or privileges related to a computing system, system hardware, and/or other computing entities. Combined with other attacks and information related to the microarchitectures (uarchs) of computing hardware, malicious individuals can obtain privilege escalations that can further allow access to protected data and/or core aspects of the computing system, such as accessing memory page tables, hardware page tables (HPTs), translation control entry (TCE) tables, hijacking controls, disabling encryption, rerouting communications, modifying task execution, etc.

Embodiments of the present invention further recognize that cloud computing architectures can be comprised of heterogeneous hardware elements, such as DRAM modules, which are further differentiated by different manufacturers. For example, within a cloud-based infrastructure, memory resources within different portions of the infrastructure (e.g., computing systems, servers, storage nodes, etc.) appear as the same quantity of memory; however, the memory resources can be of differing configurations and differing levels of quality. Therefore, some DRAM modules of a computing architecture a can be more susceptible (i.e., vulnerable) to a rowhammer-based side-channel attack that other DRAM modules. A rowhammer-type side-channel attack/vulnerability or similar attack that causes random bit-flips in memory resources will herein be referred to as a rapid repetitive rate-of-access (RRROA) type attack.

Therefore, embodiments of the present invention provide additional security to data, resources, and computing architectures at the operating and/or hardware/uarch levels. Embodiments of the present invention identify the memory resources of a computing system that are vulnerable to RRROA-type attacks directed against memory but not protected by mitigating strategies or counter-measures. Embodiments of the present invention monitor the rates of access of regions of memory (e.g., ranges of memory addresses) to identify suspicious activities of a process that performs frequent read operations while performing little to no write operations. Some embodiments of the present invention analyze the memory management and memory allocation strategies of a computing system to determine whether a range of memory addresses includes adjacent rows of memory cell. If one or more rows of adjacent memory cells correspond to another memory address range, then embodiments of present invention include the other memory address range in one or more access rate monitoring and determination steps.

Some embodiments of the present invention dynamically configure counters to monitor the rates of access of regions of memory based on various criteria and grouping strategies to increase the regions of memory that can be monitored, thereby utilizing fewer computing resources of the computing system for security purposes. For example, monitoring information related to rates of access of groups of regions of memory may be interleaved, or logically grouped based on memory address ranges to identify a region of memory that exhibits a RRROA associated with a non-system process; thereby improving the operation of the computing system. In addition, embodiments of the present invention can determine whether multiple processes are targeting a region of memory, thereby preventing an attempt to thwart a function that throttles the rate of access of the region of memory by individual processes.

Further, embodiments of the present invention can adjust to become more sensitive to responding to threats based on changes to operational characteristics of a computing system, such as temperature and supply voltage that can render some memory hardware more susceptible to bit-flips related to RRROA type attacks or a bus speed (e.g., over-clocking). For example, multiple RRROA attacks may attempt to raise the temperature of a memory chip or memory module by utilized sustained rates of access, rather than high rates of access, to trigger bit-flips in an attempt to avoid detection. In addition to system DRAM, some embodiments of the present invention can be tailored to identify a threat targeting other memory resources of a computing system, such as serial communication interface registers, memory buffers, and/or memory resources incorporated within other hardware of the computing system, such as computer processors, memory controllers, accelerator cards, graphic cards, network interface cards, etc.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating computing environment 100 in an embodiment, in accordance with the present invention. In an embodiment, computing environment 100 includes system 102 and device 140 interconnected over network 130. In some embodiments, computing environment 100 includes a plurality of instances of system 102 (e.g., a data center, a cloud computing architecture, etc.) and device 140 interconnected over network 130. Instances of system 102 may be representative of mainframe computers, a server, a computing node, a storage node, etc. Instances of system 102 may also be interconnected by a portion of network 130. Many modifications to the depicted environment may be made by those skilled in the art without departing from the scope of the invention as recited by the claims.

System 102, service element (SE) 105, and device 140 may be laptop computers, tablet computers, system consoles, personal computers (PCs), personal digital assistants (PDAs), smart phones, wearable devices (e.g., digital eyeglasses, smart glasses, a smart watch), or any programmable computer systems known in the art. In some embodiments, system 102, SE 105, and device 140 represent computer systems utilizing clustered computers and components (e.g., database server computers, application server computers, file server computer, network-attached storage devices, etc.) that act as a single pool of seamless resources when accessed through network 130, as is common in data centers and with cloud-computing applications. In general, system 102, SE 105, and device 140 are representative of any programmable electronic devices or combination of programmable electronic devices capable of executing machine readable program instructions and communicating via network 130. Alternatively, SE 105 represents a mobile computing device that is moved between and connected to different instances of system 102. System 102, SE 105, and device 140 may include components, as depicted and described in further detail with respect to FIG. 4, in accordance with embodiments of the present invention.

In an embodiment, system 102 includes hypervisor 103, system functions 104, read/write request information 106, storage 107, memory controller 120, and memory 125. In various embodiments, an instance of system 102 hosts various computing entities, such as logical partitions (LPARs), application program interfaces (APIs), containers, services, software applications of users, etc. In some embodiments, system 102 also includes SE 105.

In an embodiment, hypervisor 103 is stored in non-volatile memory of respective instances of system 102, such as in firmware or embedded within hardware (not shown). In another embodiment, hypervisor 103 is a hypervisor hosted by another operating system (not shown) executing within an instance of system 102. In various embodiments, hypervisor 103 assigns a process identifier (PID) to each process, task, or other computing entity executing within an instance of system 102. Hypervisor 103 and/or the underlying OS also generates and maintains various tables of tables 110 utilized during the operation of system 102, such as hardware page tables, segment tables, TCE tables, tables of PIDs, etc.

In some embodiments, in response to an initial program load (IPL) for an instance of system 102, hypervisor 103 utilizes one or more functions of system function 104, and/or interfaces with a respectively associated instance SE 105, to determine whether a change has occurred with respect to one or more hardware elements of the instance of system 102. If hypervisor 103 determines that a hardware element-based change has occurred, then hypervisor 103 updates system information 108 with the determined one or more hardware changes. Hypervisor 103 can direct SE 105 to obtain, via network 130, information related to memory modules and/or other hardware components, to determine a susceptibility rating to RRROA-type attacks for the new/updated hardware component. In other embodiments, if hypervisor 103 detects a hardware change while system 102 is operating, such as a hot-swap of a component and/or a power-on of another component (e.g., dynamic resource activation), then hypervisor 103 can direct SE 105 to obtain information related to the activated hardware to determine a susceptibility rating; if applicable, for the activated hardware to RRROA attacks.

In an embodiment, system functions 104 includes various programs and daemons (not shown) that support various aspects of system 102. Examples of programs within system functions 104 include a system management facility (SMF); one or more interrupt service routines (ISRs); a memory management program; a debug/dump function; communication programs/protocols; a program for monitoring input/output (I/O) activity (e.g., amounts of data, rates of data, etc.) associated with various tasks or applications, such as write activity associated with an executing process, internal and/or external network traffic activity, etc. In some embodiments, one or more IRSs of system functions 104 provides threat detection program 300 the ability to invoke one or more security functions that hypervisor 103 or an OS can utilize to pause, isolate, and/or kill a process identified as a threat to system 102.

In an embodiment, system functions 104 includes a memory management program that also assigns address-space identifiers (ASIDs) to tasks and/or processes that hypervisor 103 instantiates. Alternatively, hypervisor 103 includes the memory management program that assigns ASIDs to tasks and/or processes that hypervisor 103 instantiates. In various embodiments, the memory management function of system functions 104 also includes a capability to configure counters that monitor and determine rates of access for memory address ranges and/or groupings of memory addresses ranges. In another embodiment, if system 102 does not include an instance of SE 105, then system functions 104 also includes a suite of monitoring functions that can identify hardware information and assignments within system 102.

In an embodiment, SE 105 is another computing device associated with operation monitoring and maintenance functions associated with one or more instances of system 102. SE 105 may include various programs and data (not show), such as an OS, a web browser, a user interface, communication programs/protocols, system management utilities, etc. Data associated with system 102 may include vital product data (VPD) related to various hardware elements of system 102, such as memory modules, adapter cards, network adapters, and field-replaceable units, etc. SE 105 may also include one or more programs utilized to determine susceptibility ratings for various elements of hardware of system 102 that include memory resources. In some scenarios, one instance of SE 105 monitors a plurality of instances of system 102. Alternatively, various instances of system 102 respectively include an instance of SE 105.

In various embodiments, an instance of SE 105 accesses, via network 130, other computers and information sources (not shown), such as the websites of manufacturers of elements of hardware (e.g., components) to obtain information, such as specifications, VPD, quality and characterization information related elements of hardware within an instance of system 102. The obtained information is utilized for various determinations related to a hardware element. For example, SE 105 can obtain product information to determine whether a component of system 102 that includes a memory resource is vulnerable to a RRROA-type attack. In response to determining that the memory resource is vulnerable to RRROA-type attack, SE 105 may further identify one or more conditions, such as rates of access, durations of access, chip-specific activation counts, temperature changes, etc., that trigger bit-flips and/or affects the probabilities of bit-flips for given rates of access in response to RRROA-type attacks. Information obtained by an instance of SE 105 is utilized to update and maintain information within system information 108. In some embodiments, memory monitoring program 200, as opposed to hypervisor 103, directs SE 105 to obtain information related to one or more elements of hardware related to system 102.

Read/write request information 106 includes information respectively associated with each process executing on system 102 and the memory address ranges that each process accesses. Access to a range of memory addresses, or groupings of memory address ranges, is further identified as a read request or a write request. In various embodiments, information within read/write request information 106 is further associated with counter information 113. In an example, information within read/write request information 106 and monitoring data (e.g., rates of access) within counter information 113 can be correlated to aspects of processes that generate the read requests to access particular regions of memory.

In one embodiment, read/write request information 106 includes information that differentiates between access requests directed to memory address ranges within memory 127 and/or memory 125 as opposed to access requests to data cached within buffers 121. In other embodiments, information within read/write request information 106 is based on commands, such as RDMA requests issued to memory controller 120 by a process internal or external to system 102 that utilizes an adapter card or network interface of system 102.

In some embodiments, information within read/write request information 106 is based on commands to memory controller 120 initiated by one or more computer processors (not shown) of system 102. In an embodiment, access requests can be further tracked based on "previous adjacent instruction address match" (PAIAM) determinations. In some scenarios, a PAIAM value can be based on determining the number of repetitions of the same instruction associated with an executing process for a given number of clock or processors cycles, such as determining a PAIAM value over 16 cycles. In some instances, the number of cycles can be a variable based on one or more operational parameters associated with an instance of system 102, such as a clock speed or a bus speed. In other scenarios, a PAIAM determination may be based on identifying repeated groups of instructions. In one example, an instruction-group-based PAIAM determination determines whether cache clearing or cache bypassing instructions are coupled with a read request instruction to force reading data from within a memory resource. In another example, an instruction-group based PAIAM determination may ignore various rapid execution or no-op instructions interspersed with read access request that an RRROA attack may utilize to obfuscate the frequency of read requests. In various scenarios, read/write request information 106 includes trend-based information, such as identifying bursts of read access requests or an increasing rate of read access requests.

In an embodiment, storage 107 is representative of persistent storage, such as magnetic hard drives, flash drives, and/or storage class memory (not shown). Storage 107 includes system information 108, tables 110, memory monitoring program 200, and threat detection program 300. Storage 107 may also include various programs and information (not shown) utilized by an instance of system 102. Examples of programs and information utilized by system 102 include: various operating systems (OSs); virtualization software; virtual I/O server (VIOS) software; a file management program; a database management system; a statistical analysis suite; various hash functions; and security programs, such as an access control program and an identity management system; whitelists and blacklists; etc.

In an embodiment, system information 108 includes information related to each hardware element within system 102, such as memory 125 and memory 127. Information related to a hardware element includes, but is not limited to, an ID, VPD, a hardware definition (e.g., capabilities, technical specifications, etc.), and a location corresponding to the hardware element. Location information may include a buss address, bank ID, a slot ID, a bus ID, an interface ID, etc. System information 108 may also include one or more lookup tables that cross-reference information related to physical memory resources (e.g., modules, devices), such as bus speeds, performance ratings, physical memory address ranges corresponding to memory modules of memory 125 and memory 127. In various embodiments, system information 108 also includes information associated with other hardware elements respectively associated with an instance of system 102, such as graphics cards, network adapters, accelerator cards, etc.

In some embodiments, system information 108 included information related to a counter-measure associated with a respective memory resource (e.g., one or more memory modules of memory 125) and susceptibility ratings associated with other memory resources, such as memory modules included in memory 127 that are vulnerable to RRROA-type attacks. In one scenario, a susceptibility rating (e.g., threshold) is associated with a RRROA value that triggers bit-flips in one or more nearby memory cells. In another scenario, a memory resource may also be associated with another susceptibility rating related to another threshold, such as a maximum activation count (MAC) and/or a minimum activation window duration (MAWD). In some scenarios, the susceptibility (e.g., bit-flip (bf)) ratings of a memory resource may be described with respect to a tiered set of thresholds values or a probabilistic determination ($P_{bf}$). In an example, if RRROA value <X then $P_{bf}$=0; if RRROA value >X then $P_{bf}$=f(RRROA), where "f" is a distribution or non-linear function, such as $P_{bf}=3.7e^{-7}*(RRROA\ value)^{6.1}$.

System information 108 may also include information obtained by one or more functions of system functions 104 that monitor operational characteristics related to one or more portions of system 102, such as temperature, voltage, current, clock speeds, bus speeds, etc. In some embodiments, memory information within system information 108 can be more granular with respect to an element of memory hardware. For example, one memory module may include multiple memory chips, based on diagnostic information related to the memory module, a memory chip of the memory module is flagged as degraded based on an increased rate of errors associated with a range of memory addresses corresponding to the chip. Therefore, the memory address ranges corresponding to the degraded chip are more vulnerable to RRROA-type attacks.

Tables 110 includes memory information 112, counter information 113, and other tables (not shown), such as hardware page tables, segment tables, translation control entry tables, tables of PIDs, virtual LAN tables related in internal communications of system 102, etc. Tables 110 may also include other tables and/or databases related to responses that are automatically initiated in response to a detection of a threat and/or messages/action that are communicated to an administrator of system 102 via UI 142 of device 140. For example, tables 110 may include one or more decision trees that dictate actions to hypervisor 103, an ISR, and/or a security program in response to identifying a process exhibiting suspicious activity.

In various embodiments, information stored within two or more tables within tables 110 are cross-referenced or are associated within a lookup table. In an example, a table of ASIDs that includes memory information respectively associated with one or more PIDs utilizing or sharing an ASID. In another example, multiple tables are indexed or cross-referenced to identify the range of physical memory addresses that a process is allocated and/or can access. In an embodiment, if a table of tables 110 is stored in-memory, then the table is excluded from storage within memory resources that are susceptible to RRROA attacks (e.g., memory 127).

In some embodiments, one or more other tables within tables 110 associated with information related to an instance of system 102 are automatically populated and maintained by hypervisor 103, such as information associated with system processes that include or process critical data and/or an indicator differentiating user processes from processes related to the operation of system 102 (e.g., virtualization processes, VIOS processes, hardware drivers, etc.). In an example, hypervisor 103 creates a table that respectively associates PIDs of security, authentication, and/or system monitoring functions that generate and process data classified as critical to an instance of system 102. In other embodiments, if hypervisor 103 is a Type 2 hypervisor, then the hosting OS (not shown) executing within an instance of system 102 populates and maintains one or more tables of tables 110 and/or memory information 112.

In an embodiment, memory information 112 includes one or more tables of regions of system memory (e.g., groupings and/or ranges of physical addresses associated with memory 125 and memory 127) that store data identified as critical for an instance of system 102. In various embodiments, memory information 112 also includes information associated with a susceptibility rating for memory resources that are identified as vulnerable to RRROA-type attacks. In some embodiments, memory information 112 includes a table of regions of memory respectively associated with another hardware element different from memory 127 that includes a memory resource and stores critical data related to the other hardware elements.

In an embodiment, counter information 113 includes one or more tables generated in response to threat detection program 300 configuring counter to monitor and log the rates of access (e.g., read requests) related to one or more executing processes accessing at least one region of memory that stores data identified as critical for system 102. Information within counter information 113 may also be associated with information within read/write request information 106 and/or a table of tables 110, such as a PID table. In one embodiment, a rate of access within counter information 113 is based on one counter monitoring a memory address range. In another embodiment, a rate of access within counter information 113 is determined based on a counter monitoring one or more groupings of memory address ranges. The counter is configured to aggregate rates of access among the memory address ranges within the one or more groupings of memory addresses. In some embodiments, access information within counter information 113 is based on a set of counters configured to determine rates of access of a plurality of memory address ranges based on interleaving of memory address ranges and/or creating logical groupings of memory address ranges while duplicating memory address range monitoring. In other embodiments, counter information 113 also includes rate of access information associated with one or more serial communication interface registers.

Memory monitoring program 200 identifies, based on physical memory addresses, one or more memory resources (e.g., hardware elements) of system 102 that store data identified as critical for the operation, administration, and/or security of an instance of system 102. In an embodiment, memory monitoring program 200 determines whether various memory resources of an instance of system 102 are susceptible to RRROA-type attacks and whether a susceptible memory resource, such as a DRAM module also stores data identified as critical for system 102. In addition, memory monitoring program 200 can determine whether multiple processes access a region of memory that stores data identified as critical for system 102 and that the region of memory is within a susceptible memory resource. Memory monitoring program 200 interfaces with threat detection program 300 to monitor access to one or more regions of memory that store data identified as critical for system 102 and to determine activities (e.g., behaviors) associated with one or more processes that access the one or more regions of memory that store data identified as critical for system 102.

In some embodiments, memory monitoring program 200 includes one or more sub-functions or daemons (not shown) that can initiate during the IPL of an instance of system 102 to determine information related to memory resources of the instance of system 102. For example, a daemon associated with memory monitoring program 200 interfaces with an instance of SE 105 or utilizes network 130 to access other information sources (not shown) to determine the memory resources of the instance of system 102 (e.g., memory 127) that are susceptible to RRROA-type attacks and information related to the susceptibility of a memory resource.

In various embodiments, memory monitoring program 200 determines whether memory resources of an instance of system 102 are susceptible to another type of RRROA attack, such as packet-based, RDMA-based, or other interface card-based memory-targeting attacks. For example, RRROA-type attack executed via a coherent accelerator processor interface can access memory 125 and memory 127 while bypassing memory controller 120 and may not be included within read/write request information 106. In other embodiments, memory monitoring program 200 identifies other elements of system 102, such as accelerator cards, graphic cards, network adapters, etc., which include memory resources different from system DRAM but are susceptible to an RRROA-type attack. The other hardware element of system 102 can include other information that are identified as critical for the hardware element, such as encryption control settings, access controls parameters for a communication port, blacklists of network addresses, etc.

In an embodiment, memory monitoring program 200 can initiate one or more instances of threat detection program 300 to monitor regions of memory that store data identified as critical to an instance of system 102. In one embodiment, threat detection program 300 configures counters to monitor various regions of memory that store critical data and are susceptible to RRROA-type attacks. In another embodiment, threat detection program 300 interleaves, hashes, and/or creates logical groupings of memory address ranges with duplication. Subsequently, threat detection program 300 utilizes various logical or statistical comparisons to identify one or more memory address ranges that exhibit rates of access indicative of a potential RRROA-type attack. Threat detection program 300 analyzes the rates of access corresponding to one or more monitored regions of memory to determine whether a rate of access associated with a process exceeds a threshold value related to a region of memory, thereby flagging the process as suspicious and potentially a RRROA-type attack. Threat detection program 300 may further analyze other activities related to a process to determine whether the process is identified as a threat. In response, threat detection program 300 executes one or more responses to the process that is identified as suspicious (e.g., a threat) to an instance of system 102.

In various embodiments, threat detection program 300 determines a plurality of rates of access of differing ranges of physical memory addresses ranges as system 102 executes because processes and workloads within system 102 change (e.g., provision, start, are allocated additional resources, terminate, deprovision, etc.) over time. Therefore, the physical memory address ranges assigned to processes can dynamically change, and data identified as critical for system 102 and/or elements of system 102 can be added to or removed from regions of memory.

In other embodiments, instance of threat detection program 300 execute independent from memory monitoring program 200. For example, one instance of threat detection program 300 monitors buffers 121 and/or registers 122 of memory controller 120, and a different instance of threat detection program 300 monitors a high-speed interface card (not shown) of system 102 that includes embedded memory resources. In various embodiments, an executing instance of threat detection program 300 updates one or more actions in response to receiving new or changed information from: an instance of memory monitoring program 200, one or more events identified by hypervisor 103, an aspect of system functions 104, a hardware event handler, an OS (not shown), etc. In addition, if threat detection program 300 determines that a process exhibits suspicious activity or is flagged as a threat, then threat detection program 300 also communicates information related to the process to an administrator of system 102 via device 140.

Memory controller 120 is representative of one or more memory controllers for an instance of instance of system 102. In some scenarios, memory controller 120 can be a discrete component of system 102. In other scenarios, one or more instances of memory controller 120 are included on a computer processor or computer processor module (not shown) of system 102. In various embodiments, memory controller 120 includes buffers 121 and registers 122. In one embodiment, buffers 121 is representative of a memory resource that caches a portion of data for reuse during the operation of system 102 as opposed to accessing the data store within memory 125 or memory 127. In some embodiments, an instance registers 122 is representative of a memory resource of memory controller 120 that temporarily stores information, data, and/or commands related to or in transit between memory 125 and at least one computer processor (not shown) of system 102. In other embodiments, other instances of registers 122 are not included within memory controller 120. Alternatively, other instances of registers 122 are representative of serial communication interface registers associated with one or more other components or hardware elements (not shown) of system 102.

Memory 125 is representative of a plurality of physical memory resources (e.g., DRAM modules) of an instance of system 102. In an embodiment, memory 127 represents a subset of memory resources of memory 125 that are determined to be vulnerable to RRROA-type attacks. In various embodiments, information related to memory 125 and memory 127 is included within system information 108 and memory information 112.

In one embodiment, system 102 and device 140 communicate through network 130. Network 130 can be, for example, a local area network (LAN); a telecommunications network; a wireless local area network (WLAN); a wide area network (WAN); such as the Internet, or any combination of the previous, and can include wired, wireless, or fiber optic connections. In general, network 130 can be any combination of connections and protocols that will support communications between system 102 and device 140, in accordance with embodiments of the present invention. In some embodiments, network 130 operates locally via wired, wireless, or optical connections and can be any combination of connections and protocols (e.g., near field communication (NFC), laser, infrared, etc.).

Device 140 includes user interface (UI) 142. Device 140 may also include other programs and data (not shown), such as a web browser, a visualization program, a database program, etc. In various embodiments, device 140 utilizes network 130 or a hardwired connection to interface with SE 105. In some embodiments, device 140 is representative of a console and computer utilized to administrate (e.g., monitor, control, debug, etc.) aspects of system 102. In addition, device 140 enables memory monitoring program 200 and threat detection program 300 to communicate with an administrator of system 102. In other embodiment, device 140 is representative of a group of consoles and computers that administrate a plurality of instances of system 102 within a data center (not shown).

In one embodiment, UI 142 may be a graphical user interface (GUI) or a web user interface (WUI), and UI 142 can display text, documents, forms, web browser windows, user options, application interfaces, etc.; and include the information, such as graphic, text, and sound that a program presents to a user. In addition, UI 142 controls sequences/ actions that the user employs to execute and/or input information to one or more programs of device 140, system 102, and/or SE 105. In an example, UI 142 is representative of an interface of a SMF program, a security program, and/or a visualization program that graphically depicts information and activities identified by or associated with system 102, memory monitoring program 200 and/or threat detection program 300. In addition, the visualization information can depict: computing resource utilization including rates of access (e.g., heat maps), locations of critical data, user processes, network traffic, etc. Such visualization information can enable an administrator of system 102 to see potential RRROA attacks occurring in real-time. In various embodiments, UI 142 displays one or more icons representing applications that a user can execute via network 130, such as various programs (not shown) of system 102 and/or programs of SE 105.

In some embodiments, a user of device 140 can interact with UI 142 via a singular device, such as a touch screen (e.g., display) that performs both input to a GUI/WUI, and as an output device (e.g., a display) presenting a plurality of icons associated with apps and/or images depicting one or more executing software applications. In other embodiments, a software program (e.g., a web browser) can generate UI 142 operating within the GUI environment of device 140. UI 142 accepts input from a plurality of input/ output (I/O) devices (not shown) including, but not limited to, a tactile sensor interface (e.g., a touch screen, a touchpad) or a natural user interface (e.g., voice control unit, motion capture device, eye tracking, cyberglove, head-up display etc.). In addition to the audio and visual interactions, UI 142 may receive input in response to a user of device 140 utilizing natural language, such as written words or spoken words that device 140 identifies as information and/or commands.

Figure 2:
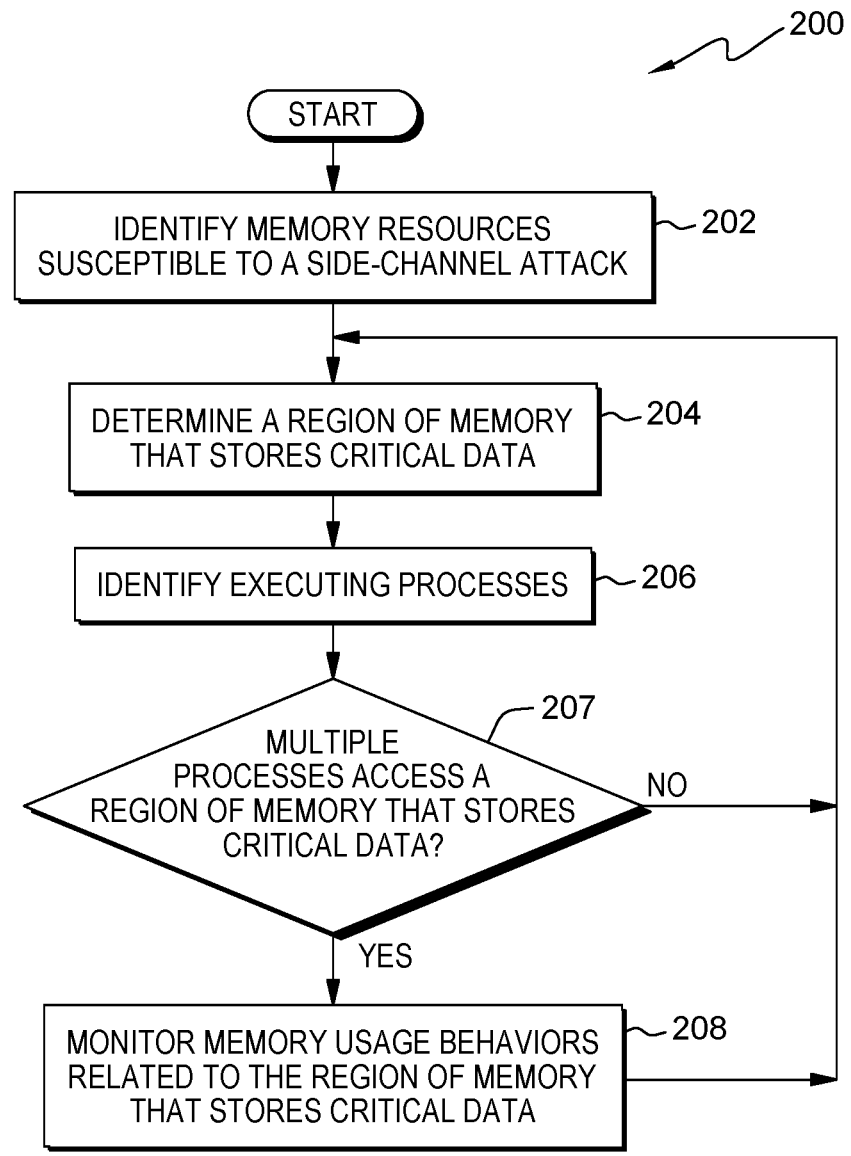
FIG. 2 depicts a flowchart of steps of a memory monitoring program, in accordance with an embodiment of the present invention.

FIG. 2 is a flowchart depicting operational steps for memory monitoring program 200, a program for determining that one or more regions of memory of a computing system, that store data identified as critical to the computing system, are stored within memory that are susceptible to a RRROA-type attack, in accordance with embodiments of the present invention. In an embodiment, an instance of memory monitoring program 200 executes within each instance of system 102 of computing environment 100 and interfaces with a respective instance of threat detection program 300. In some embodiments, an instance of memory monitoring program 200 interfaces with multiple instances of threat detection program 300.

In step 202, memory monitoring program 200 identifies memory resources susceptible to a side-channel attack. In one embodiment, memory monitoring program 200 accesses system information 108 to identify one or more memory modules (e.g., memory 127) that are identified as susceptible to a RRROA-type attack. In an embodiment, memory monitoring program 200 accesses system information 108 to identify other hardware elements of system 102 that include memory resources that are susceptible to a RRROA-type attack, such as serial communication interface registers or registers 122. In another embodiment, memory monitoring program 200 accesses system information 108 to identify other memory resources imbedded within another hardware element of system 102 that are susceptible to a RRROA-type attack, such as an accelerator card or high-speed network adapter (not shown).

In some embodiments, if memory monitoring program 200 cannot identify whether a memory resource is susceptible or not to a RRROA-type attack based on information within system information 108, then memory monitoring program 200 interfaces with an instance of hypervisor 103 respectively associated with an instance of system 102, to determine which memory resources of the instance of system 102 are susceptible to a RRROA-type attack. Hypervisor 103 may perform or direct various searches and queries to obtain the information requested by memory monitoring program 200. Memory monitoring program 200 subsequently updates system information 108 and memory information 112 with the determined information related to the susceptibility of memory resources of the instance of system 102 with respect to RRROA-type attacks.

In other embodiments, if memory monitoring program 200 cannot identify whether memory resources of an instance of system 102 are susceptible to a RRROA-type attack, then memory monitoring program 200 infers that memory resources operating without of one or more counter-measures or mitigation strategies are potentially susceptible to a RRROA-type attack. In an example, memory monitoring program 200 may determine that a memory resource includes a counter-measure based on interfacing with SE 105. Examples of counter-measures or mitigation strategies include: operating some memory resources at higher refresh rates, DRAM that includes on-module target row refresh (TRR) hardware, memory controller and computer processors utilizing pseudo TRR, etc.

In step 204, memory monitoring program 200 determines a region of memory that stores critical data. Multiple processes executing on system 102 may utilize different sets of critical data; therefore, memory monitoring program 200 can determine that a plurality of regions of memory store critical data in addition to fragmentation of critical data among memory resources. In one embodiment, memory monitoring program 200 queries hypervisor 103 to identify one or more regions of memory, such as physical address ranges of system RAM that store data identified as critical for an instance of system 102. Examples of critical data associated with an instance of system 102 include hardware page tables (HPTs), segment tables, TCE tables, authentication and access control tables, etc. In another embodiment, if memory monitoring program 200 determines that hypervisor 103 is a Type 2 hypervisor, then memory monitoring program 200 additionally queries the hosting OS (not shown) to identify regions of memory that store data identified as critical for an instance of system 102.

In other embodiments, memory monitoring program 200 queries as hypervisor 103; system functions 104; a software driver, firmware, and/or control program (not shown) a hardware element of system 102 to identify one or more regions of memory within the hardware element that store data identified as critical for the hardware element, such as access controls associated with a blacklist of internet protocol addresses. In an embodiment, in response to determining that a region of memory stores critical data, memory monitoring program 200 updates memory information 112. Memory monitoring program 200 may also update memory information 112 with information related to regions of memory within elements of hardware that store critical data. In various embodiments, memory monitoring program 200 dynamically updates memory information 112 as critical data migrates, fragments, and/or as new critical data is added during the operations of an instance of system 102.

In step 206, memory monitoring program 200 identifies executing processes. In one embodiment, memory monitoring program 200 accesses one or more tables of tables 110 to identify the plurality of processes executing on an instance of system 102. In addition to identifying executing processes, memory monitoring program 200 further determines the one or more ranges of memory addresses that are allocated to each process. For example, one process can be allocated contiguous blocks of memory whereas another process can be allocated memory that is fragmented into blocks of memory distributed among different memory chips and/or memory modules. In some embodiments, memory monitoring program 200 communicates with hypervisor 103 to identify the plurality of processes executing on an instance of system 102. In a further embodiment, memory monitoring program 200 identifies one or more processes that access a range of physical memory addresses corresponding to at least one row of memory cells adjacent to memory cells corresponding to physical memory addresses that store critical data.

In decision step 207, memory monitoring program 200 determines whether multiple processes access a region of memory that stores critical data. In one embodiment, memory monitoring program 200 determines that multiple processes access a region of memory that stores critical data by comparing information within memory information 112 to the physical memory addresses ranges utilized by processes executing on an instance of system 102. Memory monitoring program 200 may utilize one or more other tables of tables 110 to determine physical memory addresses ranges corresponding to the executing processes, such as an HPT, a segment table, a TCE table, and/or a table of PIDs. In a further embodiment, memory monitoring program 200 determines whether two or more process access a range of physical memory addresses corresponding to at least one row of memory cells adjacent to memory cells corresponding to physical memory addresses that store critical data.

In various embodiments, memory monitoring program 200 also determines whether multiple processes access other memory resources of an instance of system 102 that includes critical data. In one example, memory monitoring program 200 utilizes one or more other tables of tables 110 to determine physical memory addresses ranges corresponding to the executing processes that access one or more serial communication interface (SCI) registers (e.g., registers 122). In another example, memory monitoring program 200 interfaces with hypervisor 103, an OS, and/or a software driver, utility, and/or control program of another element (not shown) of system 102 that includes a memory resource to determine whether multiple processes access the other hardware element of system 102 that includes data critical to the other hardware element.

Responsive to determining that multiple processes access a region of memory that stores critical data (Yes branch, decision step 207), memory monitoring program 200 monitors memory usage behavior related to the region of memory that stores critical data (step 208).

In step 208, memory monitoring program 200 monitors memory usage behavior related to the region of memory that stores critical data. In an embodiment, if memory monitoring program 200 further determines that a region of memory that stores critical data and is accessed by multiple processes is also stored within one or more memory resources (e.g., memory 127) that are susceptible to a RRROA-type attack, then memory monitoring program 200 executes one or more instances of threat detection program 300 to monitor memory usage behavior related to the region of memory that stores critical data. Monitoring program 200 can interface with multiple instances of threat detection program 300. Alternatively, if memory monitoring program 200 further determines that a region of memory that stores critical data is not susceptible to a RRROA-type attack, then memory monitoring program 200 loops to step 204.

In some embodiments, memory monitoring program 200 interfaces with threat detection program 300 to configure counters and monitor memory usage behavior related to one or more regions of memory within another hardware element of system 102 different from memory 127. In other embodiments, memory monitoring program 200 interfaces with threat detection program 300 to monitor memory usage behavior related to one or more regions of memory that caches or temporarily stores critical data of system 102, such as buffers 121 and/or registers 122.

In various embodiments, memory monitoring program 200 loops based on one or more triggers, such as a duration-based trigger, and/or event-based trigger associated with an instance of system 102. Event-based triggers include: hypervisor 103 and/or an executing OS modifying one or more tables of tables 110, a change to system information 108, and/or a change has occurred within an instance of system 102.

Referring to decision step 207, responsive to determining that multiple processes do not access a region of memory that stores critical data (No branch, decision step 207), memory monitoring program 200 loops to step 204 and step 206 to determine whether a change related to system 102 affects the storage of critical data and/or affects (e.g., instantiates, terminates, changes resource allocations, etc.) processes within an instance of system 102. In one embodiment, memory monitoring program 200 loops continuously. In some embodiments, memory monitoring program 200 loops on a periodic basis. In other embodiments, memory monitoring program 200 loops based on one or more triggers, such as hypervisor 103 modifying one or more tables of tables 110 or an update occurs to system information 108.

Figure 3:
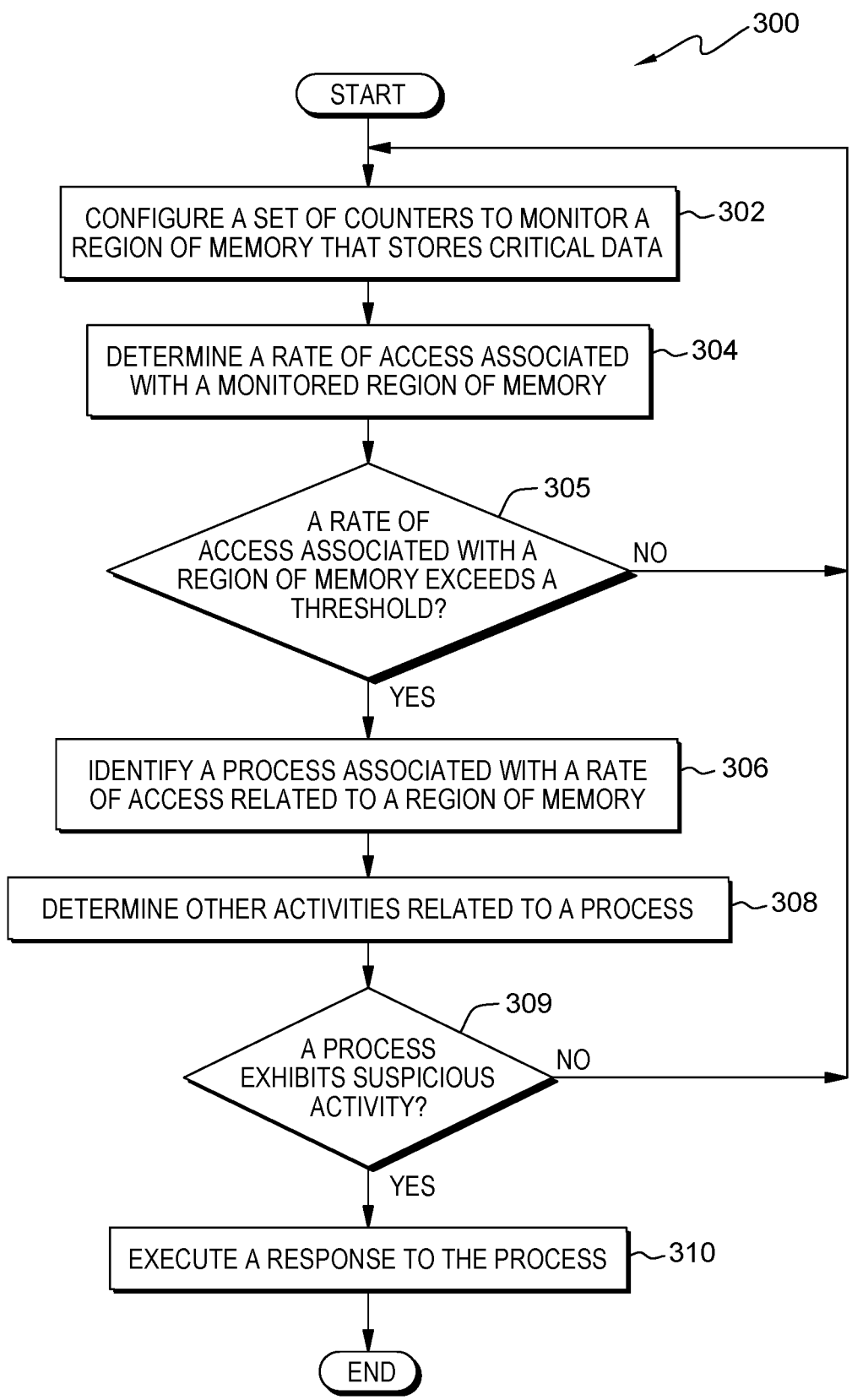
FIG. 3 depicts a flowchart of steps of a threat detection program, in accordance with an embodiment of the present invention.

FIG. 3 is a flowchart depicting operational steps for threat detection program 300, a program for determining a threat to a computing system based on monitoring rates of access of regions of memory of a computing system that stores critical information associated with the computing system, in accordance with embodiments of the present invention. In response to threat detection program 300 determining that a process that access of one or more regions of memory that stores critical information exhibit suspicious activity, threat detection program 300 executes one or more responses to the suspicious process. In an embodiment, threat detection program 300 is a subroutine of memory monitoring program 200. In some embodiments, one or more instances of threat detection program 300 are invoked by one instance of memory monitoring program 200. Multiple instances of threat detection program 300 can execute concurrently to monitor different portions (e.g., servers) of system 102.

In step 302, threat detection program 300 configures a set of counters to monitor a region of memory that stores critical data. Threat detection program 300 utilizes one or more aspects of system functions 104 to configure at least one counter that monitors one or more physical memory address ranges to determine a rate of access related to the one or more physical memory address ranges. In addition, threat detection program 300 creates one or more tables within counter information 113 that aggregate and/or store access information related to the set of counters that monitor a region of memory. In an embodiment, threat detection program 300 configures a set counters that monitor physical memory address ranges based on information determined by memory monitoring program 200, such as system information 108, memory information 112, and/or one or more other tables of tables 110. In an example, threat detection program 300 configures a set of counters to monitor various elements of memory 127 that store critical data for an instance of system 102. In another embodiment, threat detection program 300 also configures counters to monitor one or more SCI registers included within an instance of system 102. In other embodiments, threat detection program 300 configures a different set of counters to monitor memory resources included within other hardware elements of an instance of system 102, such as accelerator cards, graphic cards, high-speed interface cards, etc.

In a further embodiment, threat detection program 300 configures a set of counters to monitor a plurality of differing ranges of physical memory addresses ranges based on hashing, interleaving, and/or creating logical groupings of memory address ranges while duplicating memory address ranges. In an example, memory monitoring program 200 determines that thirty memory address ranges (e.g., memory address ranges: 1, 2, 3, . . . , 30) are to be monitored. In response, threat detection program 300 generates a table within counter information 113 that is based on eleven counters monitoring six clusters of five physical memory address ranges of sequentially increasing values; and five groups of six physical memory address ranges, cyclically selected from among the increasing physical memory address ranges.

For example, threat detection program 300 configures a first counter to monitor physical address ranges 1, 2, 3, 4, and 5 that correspond to a first cluster of memory address ranges; and a sixth counter to monitor physical address ranges 26, 27, 28, 29, and 30 that correspond to the sixth cluster of memory address ranges. Similarly, another counter monitors physical address ranges 1, 6, 11, 16, 21, and 26 that correspond to a first group of memory addresses; and a different counter monitors physical address ranges 5, 10, 15, 20, 25, and 30 that correspond to a fifth group of memory addresses. By monitoring groups of memory address ranges with duplication, threat detection program 300 can perform various logical or statistical comparisons to identify one or more memory address ranges that exhibit rates of access indicative of a potential RRROA-type attack.

In step 304, threat detection program 300 determines a rate of access associated with a monitored region of memory. In one embodiment, threat detection program 300 utilizes information obtained from a counter to determine a rate of access respectively associated with one or more physical memory address ranges that store critical data and are accessed by two or more processes. In another embodiment, threat detection program 300 utilizes information obtained from a counter to determine a rate of access associated with a group of physical memory address ranges that store critical data and are accessed by two or more processes. In an embodiment, threat detection program 300 determines a rate of access associated with a monitored region of memory based on RDMA or methods different than an access request initiated utilizing memory controller 120.

In some embodiments, threat detection program 300 utilizes information obtained from a set counter to determine a plurality of rates of access associated with a group of physical memory address ranges that are interleaved, hashed, and/or logically grouped. In various embodiments, threat detection program 300 utilizes one or more mathematical and/or statistical calculations, such as average value, media value, trend determinations (e.g., a moving average, burst rates), standard deviation, etc., to determine one or more values associated with a rate of access corresponding to a physical memory address range or a grouping of physical memory address ranges. Threat detection program 300 may utilize differing time intervals for rate-of-access calculations. In some scenarios, threat detection program 300 utilizes a time interval based on a physical characteristic associated with a memory resource, such as a bus speed or a refresh rate to calculate various rate-of-access values. In other scenarios, threat detection program 300 utilizes a time interval related to susceptibility information associated with a memory resource to calculate rate-of-access values, such as MAWD value. Threat detection program 300 updates one or more tables within counter information 113 with one or more of the determined rate-of-access values corresponding to monitored physical memory address ranges.

In decision step 305, threat detection program 300 determines whether a rate of access associated with a region of memory exceeds a threshold. In some embodiments, threat detection program 300 determines that a rate of access associated with a region of memory that includes critical data exceeds a threshold based on information within memory information 112, counter information 113, system information 108, and/or one or more other tables of tables 110. In an example, threat detection program 300 determines that the rate of access for an element of memory within memory 127 that stores critical data exceeds a RRROA susceptibility rating corresponding element of memory based on information within a lookup table within system information 108 and/or tables 110. In other embodiments, threat detection program 300 determines that a trend related to a rate of access associated with a region of memory is predicted to exceed one or more thresholds based on previously discussed data and tables.

In various embodiments, threat detection program 300 determines that a rate of access associated with a group or set of physical memory address ranges exceeds a threshold value. In a further embodiment, threat detection program 300 determines that a rate of access associated with at least one physical memory address range that includes at least one row of memory cells adjacent to memory cells corresponding to physical memory addresses that store critical data exceeds one or more thresholds based on previously discussed data and tables. In another embodiment, threat detection program 300 determines that a rate of access associated with a memory resource within another element of system 102 exceeds one or more thresholds based on previously discussed data and tables.

Responsive to determining that threat detection program 300 determines that a rate of access associated with a region of memory exceeds a threshold value or is predicted to exceed a threshold value related to a susceptibly rating for a memory resource that stores critical data (Yes branch, decision step 305), threat detection program 300 identifies a process associated with a rate of memory access (step 306).

In step 306, threat detection program 300 identifies a process associated with a rate of access related to a region of memory. In an embodiment, threat detection program 300 identifies a process associated with a rate of access related to a region of memory within one or more elements of memory (e.g., memory modules) included in memory 127. In one embodiment, threat detection program 300 utilizes memory information 112, counter information 113, and one or more tables of tables 110, such as a table of PIDs to identify a process associated with a rate of access related to a region of memory. In another embodiment, threat detection program 300 utilizes memory information 112, counter information 113, and read/write request information 106 to identify a process associated with a rate of access related to a region of memory. Threat detection program 300 can also identify a process associated with a rate of access related to a region of memory based on tracing RDMA requests.

In some embodiments, threat detection program 300 identifies a group of processes associate with an ASID corresponding to one or more memory resources included in memory 127 and a related rate of access associated with the ASID. In other embodiments, threat detection program 300 determines rate of memory access for a process associate with a memory resource of another hardware element of system 102. In a further embodiment, threat detection program 300 utilizes one or more logical tests and/or comparisons and one or more previously discussed sources of information to identify processes and to estimate respectively associated rate of access for the plurality of physical memory address ranges that were interleaved, hashed, and/or logically grouped (previously discussed with respect to step 302).

In step 308, threat detection program 300 determines other activities related to a process. In one embodiment, in response to threat detection program 300 determining that a process is associated with a potential RRROA behavior (e.g., exceeds a threshold rate of access), threat detection program 300 accesses read/write request information 106 to further determine whether the process is also associated with one or more PAIAM determinations (previously discussed with respect to read/write request information 106). In response to determining that the process is also associated with one or more PAIAM determinations, threat detection program 300 flags the process as suspicious (e.g., a potential threat to system 102).

In another embodiment, threat detection program 300 determines whether a combination of processes is associated with a potential RRROA attack, such as causing a set of conditions that facilitate a RRROA-type attack. In one example, threat detection program 300 determines that a first process executes an access pattern that causes cache evictions within buffers 121, while other processes access a region of memory at an aggregated rate that exceeds a susceptibility rating for a memory module, thereby increasing the probability of bit-flips. In another example, threat detection program 300 determines that a group of processes exhibits suspicious activity based on an aggregated rate of memory access for physical memory address ranges, such as an ASID that includes memory cells adjacent to physical memory address ranges that include critical data.

Still referring to step 308 in some embodiments, threat detection program 300 identifies other suspicious activities associated with accessing a region of memory. In an example, a load-balancer of system 102 throttles activity of a process accessing one region of memory. If threat detection program 300 determines that hypervisor 103 spawns one or more new processes that access at least a portion of the same region of memory utilized by the throttled process, then threat detection program 300 flags the throttled process and the spawned processes as suspicious.

In other embodiments, threat detection program 300 utilizes a decision tree within tables 110 to determine whether a current pattern of memory access is identified as an outlier and not a threat, based on patterns of access that were previously analyzed and positioned by an administrator of system 102. In response to determining that a pattern of access is identified as an outlier, threat detection program 300 notifies an ISR that the pattern of access identified as an outlier is permitted.

In decision step 309, threat detection program 300 determines whether a process exhibits suspicious activity. In one embodiment, threat detection program 300 determines that a process exhibits suspicious activity based on determining that a rate of access or a trend related to a rate access of a memory region, which exceeds a threshold value. In another embodiment, threat detection program 300 determines that a process exhibits suspicious activity based on one or more additional factors, such as one or more flags assigned to a process, an indication of cache purges, an indication of cache evictions, one or more unusual PAIAM determinations, etc. In some embodiments, threat detection program 300 determines that a group of processes exhibits suspicious activity. In other embodiments, threat detection program 300 determines that a process accessing or executing on another hardware element of system 102 exhibits suspicious activity, such as a high level of RDMA requests to region of memory that include critical data.

Responsive to determining that a process exhibits suspicious activity (Yes branch, decision step 309), threat detection program 300 executes a response to the process (step 310). In another embodiment, responsive to determining that a process is flagged as a threat or suspicious (Yes branch, decision step 309), threat detection program 300 executes a response to the process.

In step 310, threat detection program 300 executes a response to the process. In one embodiment, threat detection program 300 invokes an ISR to execute one or more actions to a process that exhibits a suspicious activity. In one scenario, threat detection program 300 dictates that the ISR pauses and isolates a suspicious process. In addition, threat detection program 300 transmits a notification to an administrator of system 102 identifying the suspicious process and providing additional information related to the process, such as a user ID, an initiating location, thread traces, PAIAM information, a program dump, etc. In another scenario, threat detection program 300 accesses information within tables 110, such as a decision tree to determine one or more responses and/or corrective action to processes exhibiting suspicious activities or flagged as threats. For example, threat detection program 300 may determine to modify the privileges assigned to the process and/or to selectively block requests to access a region of memory.

In another embodiment, threat detection program 300 utilizes an ISR to modify the activity the suspicion process. Threat detection program 300 subsequently determines whether the suspicious process executes without change or whether the suspicious process performs other actions in response to the ISR modifying the activity of the process. If threat detection program 300 determines that the process executes other suspicious actions in response to the ISR modifying the activity of the process, then threat detection program 300 pauses the process and executes a security program to analyze the process and/or a function to dump the process for further investigation.

In one example, if threat detection program 300 utilizes the ISR to throttle a process and the process self-terminates, then threat detection program 300 executes a dump function on the process for further investigation. In another example, if threat detection program 300 utilizes the ISR to throttle a process and other processes spawn to access the same regions of memory, then threat detection program 300 determines the processes are threats and utilizes the ISR or hypervisor 103 to terminate the processes.

Still referring to step 310 in some embodiments, detection program 300 utilizes hypervisor 103 or an underlying OS to execute one or more responses to a suspicious process. In an example, detection program 300 utilizes hypervisor 103 to pause the suspicious process, allocate other memory resources within memory not susceptible to RRROA-type attacks, and migrates the process to the other memory resources. If the migrated process executes normally, then threat detection program 300 permits the process to continue to execute. However, if the process attempts to re-access a region of memory that stores critical data, then threat detection program 300 terminates the process. In a further embodiment, detection program 300 utilizes a memory management function (not shown) and/or hypervisor 103 to identify group of processes that individually do not exhibit suspicious activity; however, the aggregation of activities of the group of processes is determined as suspicious. In response, detection program 300 executes one or more responses to each of the group of activities determined as suspicious.

In other embodiments, detection program 300 utilizes hypervisor 103, an ISR, and/or a control program for another hardware element of system 102 to execute a response to a process exhibiting suspicious activity. In one example, if detection program 300 determines that a process executing within the other hardware element of system 102 is associated with suspicious RDMA activity, then detection program 300 may block port IDs or internet protocol (IP) addresses associated with the process. In another example, if detection program 300 determines that a process executing within the other hardware element of system 102 is associated with one or more suspicious activities within the other hardware element, then detection program 300 utilizes a control program of the other hardware element to execute a response to a process exhibiting suspicious activity, such as terminating and blacklisting the process.

Referring to decision step 305, responsive to determining that threat detection program 300 determines that a rate of access associated with a region of memory does not exceeds a threshold (No branch, decision step 305), threat detection program 300 loops to continue monitoring regions of memory within the computing system (step 302). In an embodiment, threat detection program 300 pauses at step 302 until new information is received from memory monitoring program 200 and/or hypervisor 103 indicating a change to one or more aspects of an instance of system 102.

Referring to decision step 309, responsive to determining that threat detection program 300 determines a process does not exhibit suspicious activity (No branch, decision step 309), threat detection program 300 loops to continue monitoring regions of memory the computing system (step 302). In an embodiment, threat detection program 300 pauses at step 302 until new information is received from memory monitoring program 200 and/or hypervisor 103 that indicates a change to one or more aspects of an instance of system 102, such as obtaining information related to one or more changes associated with regions of memory that store critical data associated with system 102.

Figure 4:
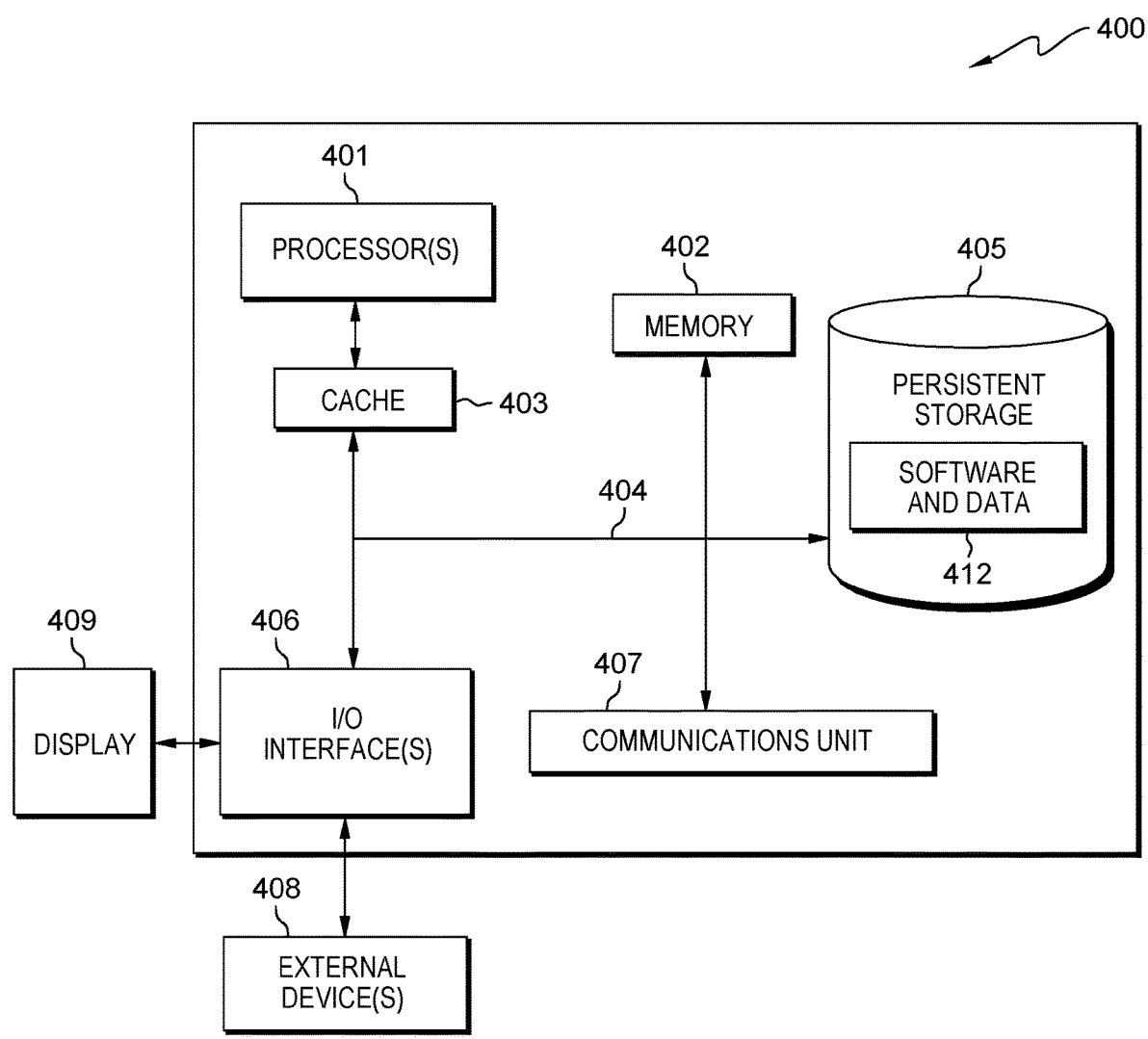
FIG. 4 is a block diagram of components of a computer, in accordance with an embodiment of the present invention.

FIG. 4 depicts computer system 400, which is representative of system 102 and device 140. In an embodiment, computer system 400 is also representative of SE 105. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch. In some embodiments, communication fabric 404 includes memory controller 120.

Memory 402 and persistent storage 405 are computer readable storage media. In this embodiment, memory 402 includes random-access memory (RAM). In some embodiments, memory 402 is representative of memory 125 and memory 127 (e.g., DRAM). In other embodiments, memory 402 is representative of embedded memory within one or more other hardware elements, such an instance of I/O interface(s) 406 and/or communications unit 407. In general, memory 402 can include any suitable volatile or non-volatile computer readable storage media. Cache 403 is a fast memory that enhances the performance of processor(s) 401 by holding recently accessed data, and data near recently accessed data, from memory 402. In an embodiment, cache 403 is also representative of buffers 121 and/or registers 122.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to system 102, software and data 412 includes hypervisor 103, system functions 104, read/write request information 106, system information 108, tables 110, memory information 112, counter information 113, memory monitoring program 200, threat detection program 300, and other programs and data (not shown). With respect to device 140, software and data 412 includes UI 142, and other data and programs (not shown).

Communications unit 407, in these examples, provides for communications with other data processing systems or devices, including resources of system 102, SE 105, and device 140. In these examples, communications unit 407 includes one or more network interface cards. Communications unit 407 may provide communications, through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. Display 409 can also function as a touch screen, such as the display of a tablet computer or a smartphone.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for managing memory within a computing system, the method comprising:
   identifying, by one or more computer processors, a range of physical memory addresses that store a first data;
   determining, by the one or more computer processors, whether a second data is stored within the range of physical memory addresses that stores the first data;
   responsive to determining that the second data is stored within the range of physical memory addresses that store the first data, determining, by the one or more computer processors, whether a process accessing the second data is identified as associated with a side-channel attack;
   responsive to determining that the process accessing the second data is associated with the side-channel attack, initiating, by the one or more computer processors, a response associated with the process accessing the second data;
   responsive to initiating the response associated with the process accessing the second data, configuring, by the one or more computer processors, a set of counters to monitor the range of physical memory addresses that stores the first data;
   determining, by the one or more computer processors using the set of counters, a rate of access associated with the monitored range of physical memory addresses; and
   responsive to the rate of access associated with the monitored range of physical memory addresses exceeding a threshold value, identifying, by the one or more computer processors, one or more processes associated with the rate of access.

2. The method of claim 1, wherein the first data is identified as critical data related to the computing system.

3. The method of claim 1, further comprising:
  determining, by the one or more computer processors, whether at least a portion of the first data and at least a portion of the second data are stored within one or more memory modules that are susceptible to the side-channel attack, based on the range of physical memory addresses respectively associated with storing the first data and the second data;
  responsive to determining that at least the portion of the first data and at least the portion of the second data are stored among the one or more memory modules that are susceptible to the side-channel attack, determining, by the one or more computer processors, a rate of access corresponding to the second data; and
  determining, by the one or more computer processors, that the process that accesses the second data is associated with the side-channel attack based on determining the rate of access corresponding to the second data exceeds a susceptibility rating corresponding to a memory module that stores the first data.

4. The method of claim 1, wherein determining whether the process accessing the second data is identified as associated with the side-channel attack is based on determining that a repetitive rate-of-access of a memory module that stores the second data exceeds a refresh rate of the memory module.

5. The method of claim 3, wherein the susceptibility rating of the memory module based on is based on information selected from the group a group consisting of a rate of read requests, a temperature of the memory module, one or more characteristics of the memory module determined by a manufacturer of the memory module, and a rate of over-clocking.

6. The method of claim 1, further comprising:
  determining, by the one or more computer processors, whether two or more processes access the second data;
  responsive to determining that the two or more processes access the second data, determining, by the one or more computer processors, whether an aggregated rate of access of the second data by the two or more processes exceeds a susceptibility rating corresponding to a memory module that stores the first data; and
  responsive to determining that the aggregated rate of access of the second data by the two or more processes exceed the susceptibility rating corresponding to the memory module that stores the first data, determining, by the one or more computer processors, that the two or more processes are associated with the side-channel attack.

7. The method of claim 1, further comprising:
  determining, by the one or more computer processors, an identity of the process accessing the second data based on accessing one or more tables generated by a hypervisor of the computing system.

8. A computer program product for managing memory within a computing system, the computer program product comprising:
  one or more computer readable storage media and program instructions stored on the one or more computer readable storage media, the program instructions readable/executable by one or more computer processors:
  program instructions to identify a range of physical memory addresses that store a first data;
  program instructions to determine whether a second data is stored within the range of physical memory addresses that stores the first data;
  responsive to determining that the second data is stored within the range of physical memory addresses that store the first data, program instructions to determine whether a process accessing the second data is identified as associated with a side-channel attack;
  responsive to determining that the process accessing the second data is associated with the side-channel attack, program instructions to initiate a response associated with the process accessing the second data;
  responsive to initiating the response associated with the process accessing the second data, program instructions to configure, by the one or more computer processors, a set of counters to monitor the range of physical memory addresses that stores the first data;
  program instructions to determine, by the one or more computer processors using the set of counters, a rate of access associated with the monitored range of physical memory addresses; and
  responsive to the rate of access associated with the monitored range of physical memory addresses exceeding a threshold value, program instructions to identify, by the one or more computer processors, one or more processes associated with the rate of access.

9. The computer program product of claim 8, wherein the first data is identified as critical data related to the computing system.

10. The computer program product of claim 8, further comprising:
  program instructions to determine whether at least a portion of the first data and at least a portion of the second data are stored within one or more memory modules that are susceptible to the side-channel attack, based on the range of physical memory addresses respectively associated with storing the first data and the second data;
  responsive to determining that at least the portion of the first data and at least the portion of the second data are stored among the one or more memory modules that are susceptible to the side-channel attack, program instructions to determine a rate of access corresponding to the second data; and
  program instructions to determine that the process that accesses the second data is associated with the side-channel attack based on determining the rate of access corresponding to the second data exceeds a susceptibility rating corresponding to a memory module that stores the first data.

11. The computer program product of claim 8, wherein program instructions to determine whether the process accessing the second data is identified as associated with the side-channel attack is based on program instructions to determine that a repetitive rate-of-access of a memory module that stores the second data exceeds a refresh rate of the memory module.

12. The computer program product of claim 10, wherein the susceptibility rating of the memory module based on is based on information selected from the group a group consisting of a rate of read requests, a temperature of the memory module, one or more characteristics of the memory module determined by a manufacturer of the memory module, and a rate of over-clocking.

13. The computer program product of claim 8, further comprising:
  program instructions to determine whether two or more processes access the second data;
  responsive to determining that the two or more processes access the second data, program instructions to determine whether an aggregated rate of access of the second data by the two or more processes exceed a susceptibility rating corresponding to a memory module that stores the first data; and responsive to determining that the aggregated rate of access of the second data by the two or more processes exceed the susceptibility rating corresponding to the memory module that stores the first data, program instructions to determine that the two or more processes are associated with the side-channel attack.

14. The computer program product of claim 8, further comprising:

program instructions to determine an identity of the process accessing the second data based on accessing one or more tables generated by a hypervisor of the computing system.

15. A computer system for managing the memory a memory within a computing system, the computer system comprising:

one or more computer processors;

one or more computer readable storage media; and program instructions stored on the one or more computer readable storage media for execution by at least one of the one or more computer processors, the program instructions comprising:

program instructions to identify a range of physical memory addresses that store a first data;

program instructions to determine whether a second data is stored within the range of physical memory addresses that stores the first data;

responsive to determining that the second data is stored within the range of physical memory addresses that store the first data, program instructions to determine whether a process accessing the second data is identified as associated with a side-channel attack;

responsive to determining that the process accessing the second data is associated with the side-channel attack, program instructions to initiate a response associated with the process accessing the second data;

responsive to initiating the response associated with the process accessing the second data, program instructions to configure, by the one or more computer processors, a set of counters to monitor the range of physical memory addresses that stores the first data;

program instructions to determine, by the one or more computer processors using the set of counters, a rate of access associated with the monitored range of physical memory addresses; and responsive to the rate of access associated with the monitored range of physical memory addresses exceeding a threshold value, program instructions to identify, by the one or more computer processors, one or more processes associated with the rate of access.

16. The computer system of claim 15, wherein the first data is identified as critical data related to the computing system.

17. The computer system of claim 15, further comprising:

program instructions to determine whether at least a portion of the first data and at least a portion of the second data are stored within one or more memory modules that are susceptible to the side-channel attack, based on the range of physical memory addresses respectively associated with storing the first data and the second data;

responsive to determining that at least the portion of the first data and at least the portion of the second data are stored among the one or more memory modules that are susceptible to the side-channel attack, program instructions to determine a rate of access corresponding to the second data; and program instructions to determine that the process that accesses the second data is associated with the side-channel attack based on determining the rate of access corresponding to the second data exceeds a susceptibility rating corresponding to a memory module that stores the first data.

18. The computer system of claim 15, wherein program instructions to determine whether the process accessing the second data is identified as associated with the side-channel attack is based on program instructions to determine that a repetitive rate-of-access of a memory module that stores the second data exceeds a refresh rate of the memory module.

19. The computer system of claim 15, further comprising:

program instructions to determine whether two or more processes access the second data;

responsive to determining that the two or more processes access the second data, program instructions to determine whether an aggregated rate of access of the second data by the two or more processes exceed a susceptibility rating corresponding to a memory module that stores the first data; and responsive to determining that the aggregated rate of access of the second data by the two or more processes exceed the susceptibility rating corresponding to the memory module that stores the first data, program instructions to determine that the two or more processes are associated with the side-channel attack.

20. The computer system of claim 15, further comprising:

program instructions to determine an identity of the process accessing the second data based on accessing one or more tables generated by a hypervisor of the computing system.

* * * * *